July 20, 1965 G. J. CROWDES 3,196,321
CONTINUOUS READING METER RELAY HAVING ANTI-BOUNCE CONTACT FEATURE
Filed July 18, 1961 2 Sheets-Sheet 1

INVENTOR.
GEORGE J. CROWDES
BY
Richard MacCutcheon
ATTORNEY

INVENTOR.
GEORGE J. CROWDES
BY
Richard MacCutcheon
ATTORNEY

United States Patent Office 3,196,321
Patented July 20, 1965

3,196,321
CONTINUOUS READING METER RELAY HAVING
ANTI-BOUNCE CONTACT FEATURE
George J. Crowdes, Chesterland, Ohio, assignor, by
mesne assignments, to API Instruments Company,
Chesterland, Ohio, a corporation of Ohio
Filed July 18, 1961, Ser. No. 124,975
7 Claims. (Cl. 317—152)

The present invention relates to electrical control and has significance in connection with circuits for galvanometer type relays provided with contacts particularly when arranged for "continuous reading" (outside the limits of "toggle contacts") as disclosed, for example, in copending patent application Ser. No. 833,274, now Patent Number 3,121,190, filed August 12, 1959 in the names of Crowdes, Hausdorf and Hammond and assigned to the assignee of the present invention. This type meter relay has proved commercially and technically valuable especially as improved by using an associate "biased" relay as separately disclosed and claimed in copending patent application Ser. No. 83,335, now Patent Number 3,121,-191, filed Jan. 17, 1961 in the names of Saint-Amour and Quittner and assigned to the same assignee.

Heretofore, one operational weakness has existed in this type of equipment. When the toggle carrying contact pointer is set near either end of the meter scale, with contact engagement a condition known as "bounce" may occur, particularly with meter movements having little damping and/or connected in high impedance signal circuits. The torque produced by the locking coil, being sufficient to cause the overcenter toggle to operate, develops sufficient signal pointer momentum so that in combination with spring action of the mechanical signal pointer stop, the signal pointer rebounds and touches the relatively stationary contact on the reverse side of the toggle. This in turn causes reverse toggling. If the signal is such that the signal pointer does not come to rest beyond (or inside) the adjustable pointer contacts, a continuous, regenerative cycling can ensue.

In initial production continuous reading meter relays were provided with adjustable pointer stops set at 15% of full scale from each end of the scale, making 30% of the scale unusable for control purposes, to avoid the "bounce" problem. Later, improved knowledge of details of contact and pointer stop adjustment made it possible to adopt a stop setting of 10%, so that only 20% of the scale was unusable. However, maintaining this standard was expensive because meters often required excessive adjustment time.

It is an object of the present invention to provide simple and inexpensive means overcoming the above difficulties.

Another object is to provide apparatus permitting contact pointer stops of a continuous reading meter relay to be placed anywhere with full utilization of the meter scale for contact pointer set points and without incurring signal pointer bounce.

Other objects and advantages will become apparent and the invention may be better understood from consideration of the following description taken in connection with the accompanying drawings, in which.

According to one aspect, our invention comprises additions to previously disclosed continuous reading meter relay control circuits, which additions provide a short period following a toggle and load relay action during which the locking contacts are disarmed, after which period their locking circuits and supply voltages are fully restored. Several appropriate techniques are detailed, of which the preferred one has (inserted between power supply and the meter relay contacting and locking components) a series resistor and shunt capacitor serving as a slow recharge energy storage, and a series connected four-layer (Shockley) avalanche effect transistor which becomes a low resistance when the voltage across it exceeds a value characteristic of its construction, and an almost infinite resistance after the current passing through it drops below a value characteristic of its construction.

Figure 1:
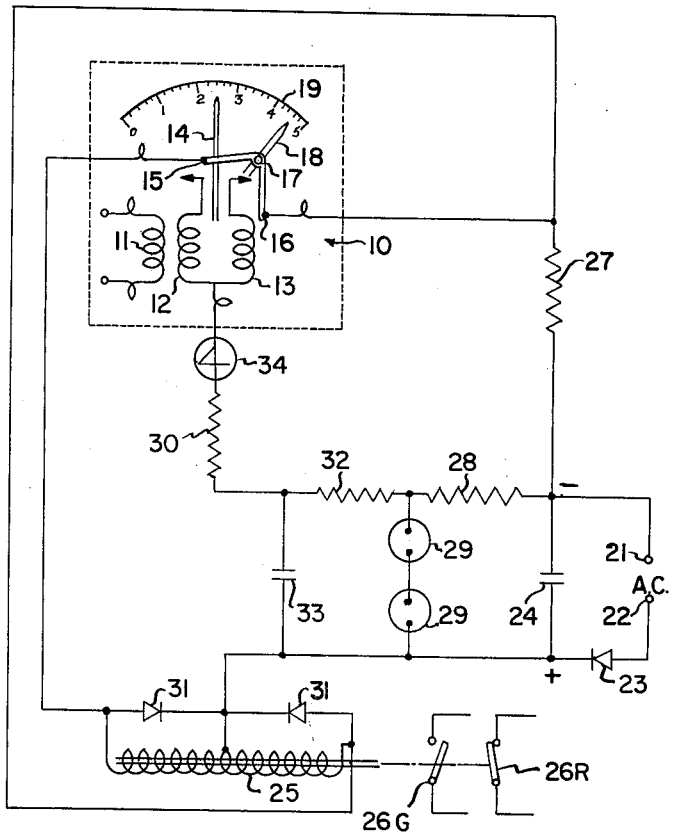
FIG. 1 is a circuit diagram showing a preferred embodiment of improved meter relay circuitry which is according to the invention.

In FIG. 1 a contact meter 10 is assumed provided with a permanent magnet (not shown) reactive to which a signal coil 11 is pivotally responsive to signal current from a source (not shown). Two locking coils 12, 13 (one for each direction of travel) are mounted to move with coil 11 as does a signal pointer 14.

As in the copending applications, two "throwable" contacts 15, 16 are mutually movable around a single pivot 17 and thereby mounted on a manually adjustable set pointer 18, pointers 14 and 18 cooperating with a viewable scale plate 19. It is contemplated that the contacts 15 and 16 are insulated one from the other, at least for any embodiment following the exact circuitry of the present case drawings.

As illustrated, an A.C. source at the terminals 21, 22 feeds through a rectifier 23—smoothing capacitor 24 arrangement so that, at proper time, it will energize a center tapped coil 25 of a relay having contacts 26G and 26R for controlling a load (not shown). One half of the two part coil 25 is polarized by a resistor 27 (as in the last mentioned copending application). If desired a resistor 28 and neon devices 29 may be added for voltage regulation. In accordance with more or less conventional practice there may be a current limiting resistor 30 and (to take up the "kick" of the relay half coils and prevent arcing across the meter relay contacts) there may be arc suppression rectifiers 31. As hereafter more fully explained there is also a time limited coulomb (or time limited watt second) supply in the form of a charging resistor 32, shunt capacitor 33 and a series break-down device 34 which may take the form of a Shockley four-layer transistor type 4 E 100–8 while resistor 32 may have a rating of 33,000 ohms and capacitor 33 may have a rating of 12 mfd.

Figure 2:
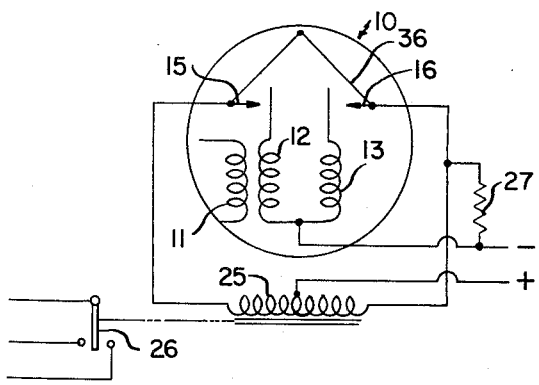
FIG. 2 is a simplified diagram which, for comparative purposes, is according to the disclosure of Ser. No. 83,-335 patent application.

In FIG. 2 are illustrated the basic elements of a previously disclosed simple electrically polarized relay control circuit for a meter relay. A continuous reading meter relay 10, having a signal responsive moving coil 11, and locking coils 12 and 13 has individual moving contacts cooperative with a downscale contact 15 and an upscale contact 16, such manually settable contacts being mounted on a toggle device symbolically suggested by the inverted V 36. The control circuitry consists of a relay, having a center-tapped coil 25 and at least one set of contacts 26, a relay polarizing or "biasing" resistor 27, and a direct current power supply symbolized by its connections, "plus" and "minus."

The operation of the circuit of FIG. 2 may be summarized as follows: The relay coil 25, value of resistor 27, and power supply voltage are selected so that when the relay clapper (not shown) closes the magnetic circuit, the clapper will be held in closed position by the continuous flux generated by the ampere turns provided by resistor 27. However, these ampere turns are selected low enough so that when the magnetic circuit is open due to the clapper being lifted, there is insufficient magnetic attraction to pull it in. When the locking contact associated with coil 13 is moved upscale by current in signal winding 11, it mates with contact 16 causing current to pass not only thru locking coil 13 but through the portion of the relay coil 25 through which bias current steadily passes via resistor 27. The additional current is sufficient to pull in the relay clapper as well as operate toggle 36. This lifts contact 16 out of the path of movement of the contacts of locking coils 12 and 13, and lowers contact 15 into that path. The signal pointer is now to the right.

When the current in signal coil 11 decreases, the contact of locking coil 12 mates with contact 15 causing current to flow in the portion of relay coil 25 not energized through resistor 27, reducing the magnetic flux in the relay magnetic circuit and causing the clapper to drop out. The same current operates the toggle 36, lifting contact 15 out of the movement path of the contacts of locking coils 12 and 13, and lowering contact 16 into the path. The signal pointer is now to left of the contact pointer.

Figure 3:
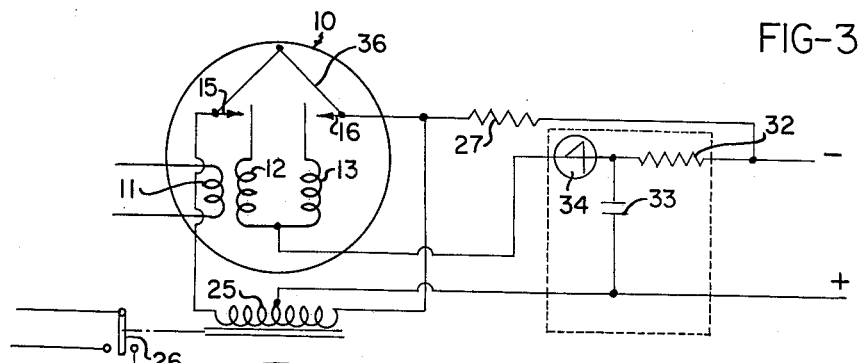
FIG. 3 is a simplified diagram showing the basic elements of the FIG. 1 arrangement.

FIG. 3 simplifies the FIG. 1 preferred embodiment of our improvement over the fundamental circuitry described in connection with FIG. 2, by the new section showing a dashed line enclosure for components 34, 32 and 33. The relay polarizing current passing through resistor 27 is not affected by the new circuitry, and so still returns to the "minus" terminal of the power supply. In series with the power supply is the charging resistor 32, regulating the rate at which the shunt capacitor 33 can be recharged by the power supply, the two appearing to the toggling circuit as a power supply capable of supplying full voltage and current for a short time only. In series with this "time-limited coulomb" supply is a Shockley four-layer transistor 34, such as may be obtained from Shockley Transistor unit of Clevite Transistor, Stanford Industrial Park, Palo Alto, California. This transistor has the characteristic that when a voltage larger than a certain voltage (characteristic of the particular transistor or type) is applied to its terminals, it will "break-down" and offer a very low resistance to the passage of current through it. Once it has broken down, its resistance will remain low until the current flowing through it drops below a characteristic level, whereupon it will "shut off," and become a high resistance until its voltage breakdown characteristic is again exceeded.

The manner in which the added components 32, 33 and 34 cooperate advantageously is as follows: When the signal in signal coil 11 increases, locking coil 13 contact mates with adjacent toggle contact. Capacitor 33 has recharged via charging resistor 32 since any previous toggling action, so that the voltage available is larger than the breakdown voltage of the transistor 34. The transistor 34 therefor breaks down and presents only negligible resistance to the circuit including the biased portion of the relay coil, permitting toggling to occur as before. However, the toggling action partially discharges capacitor 33 to a voltage below the breakdown voltage of transistor 34, and the transistor 34 is "shut off" as soon as the toggle action opens the circuit reducing the transistor current to zero. When the moving elements bounce, asusme they cause the contact of locking coil 12 to touch toggle contact 15. Because transistor 34 is still shut-off, and cannot turn on again until sufficient voltage is available across capacitor 33, there is no voltage available at this contact 15, and the moving coil system finds a position corresponding to the signal. Meanwhile capacitor 33 is being recharged through resistor 32, so that within a second or two a voltage in excess of transistor breakdown voltage is available for downscale toggling when the signal changes appropriately. Precisely the same action of the added components 32, 33 and 34 occurs in downscale toggling as described above for upscale toggling.

An advantage of this arrangement is that if the signal should drop below the set point of pointer 18 during the time when the contacts are disarmed, although toggling and relay operations are delayed briefly, when firing voltage has built up, full toggling "coulombs" are available, and neither the toggle 17 nor the load relay 25 can be fooled into misfunctioning.

Various alternate equivalent means of accomplishing substantially the same combined effect are easily found, though possibly with some disadvantages as compared with the preferred arrangement. For example, a less expensive device for replacing the transistor in FIG. 1 would be a neon tube, and such a circuit will work, but usually a neon tube cuts off at a high voltage relative to its ignition voltage, and when conducting has a low resistance only with respect to a constant voltage drop, possibly leading to unsatisfactory circuit conditions.

Figure 4:
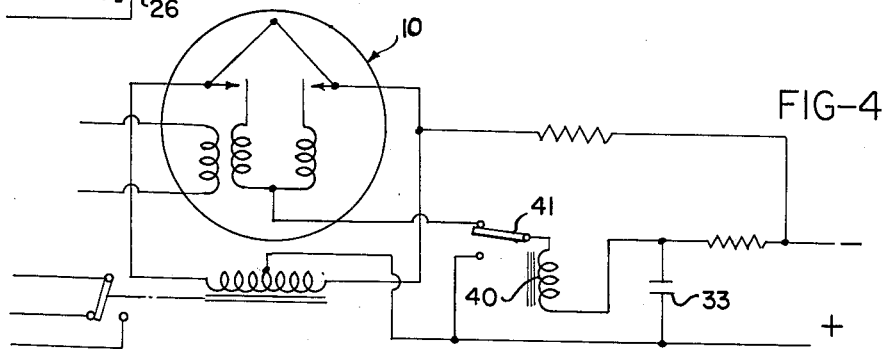
FIG. 4 illustrates a modification.

FIG. 4 illustrates an embodiment in which the transistor 34 of FIG. 1 is replaced with a relay 40 having SPDT contacts 41. The effective operation depends upon the current drawn (in toggling) pulling-in relay 40 and locking it in by the normally open contacts of contact set 41. When the charge in capacitor 33 has been largely removed through the coil of 40, the contact set 41 will return to normal, deenergized position. During the period when contacts 41 were in energized position no current was available at toggle contacts, so that regenerative, powered bouncing is made impossible, as in the circuit of FIG. 1.

Figure 5:
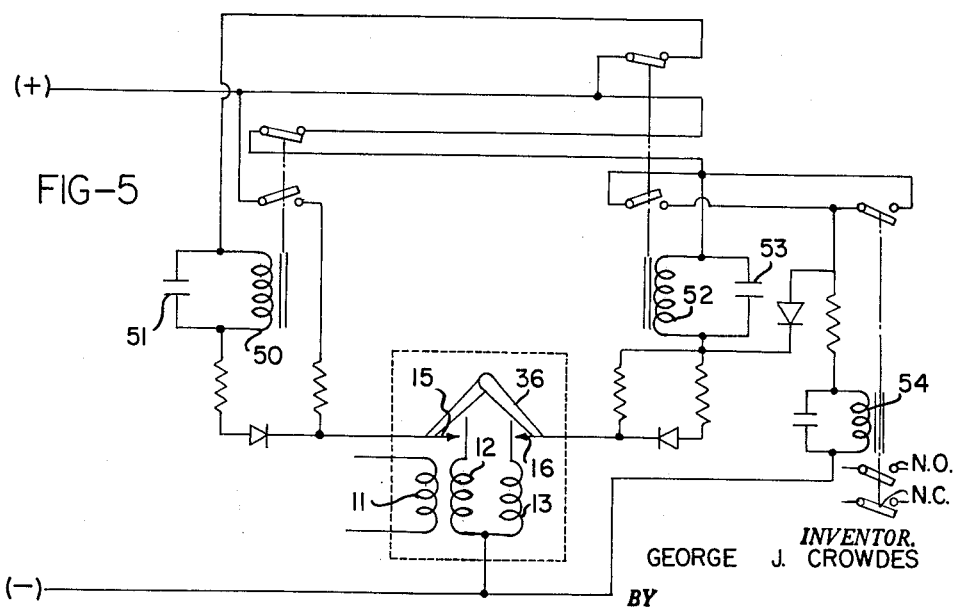
FIG. 5 shows another modification.

Another embodiment of our invention is shown in FIG. 5. Here a relay coil 50 is paralleled with a capacitor 51, as relay coil 52 is provided with a capacitor 53. When a high or low toggle contact (16 or 15) is made by the respective locking coil (13 or 12), the respective relay (52 or 50) is energized and its associated capacitor (53 or 51) charged, while the contact energizing circuit of the as yet unenergized contact (15 or 16) is held open until the capacitor (53 or 51) discharges sufficiently to drop out its relay. A third relay 54 is arranged to be programmed by the operation of relays 50 and 52, locking itself in when relay 52 is momentarily energized, unlocking when relay 50 is momentarily energized, and providing exterior load controlling contacts.

There is thus provided apparatus of the class described capable of meeting the objects above set forth and with minimal expense in materials and because adjustment time is minimized and expensive or performance limiting changes are not required to be made to either the meter relay or its controlled circuitry, and still 100% of meter scale is made available for set point adjustment.

While I have illustrated and described particular embodiments, various modifications may obviously be made without departing from the true spirit and scope of my invention which I intend to have defined only by the appended claims taken with all reasonable equivalents.

I claim:

1. In combination, a continuous reading contact meter and circuitry, comprising:
    an adjustable toggle contact type meter having a signal coil, at least one locking coil, a movable contact and, co-operable therewith, a pair of mutually adjustable, mutually pivotable toggle contacts,
    means for providing a signal to said meter signal coil, means including a source of control voltage power and a loop circuit having interconnections for
        (a) energizing said locking coil when contacts of the meter mate,
        (b) deriving a useful output signal because contacts of the meter mate,
        (c) toggling, i.e., throwing the toggle to disengage the meter contacts and de-energize the locking coil and interrupt the loop circuit and place a different one of the pair of contacts in the path of the movable contact, and electrically operable means arranged in said loop circuit and configured and arranged to further disable the loop circuit for a predetermined time after disengagement of contacts due to said toggling.

2. The combination of claim 1 further characterized by said electrically operable means arranged in said loop circuit comprising a loop current flow sensing element.

3. The combination of claim 2 further characterized by the current flow sensing element being a Shockley transistor.

4. The combination of claim 2 further characterized by the current flow sensing element being a relay having its coil arranged in series in said loop circuit, said relay having a contact which is also in series in said loop circuit and arranged to temporarily disable at least a portion of the loop circuit with energization of the coil of said relay.

5. The combination of claim 4 further characterized by a shunt capacitor around the coil of said last mentioned relay.

6. In circuits for continuous reading meter relays having rotatable meter relay contact means and for mating therewith two relatively stationary while mutually adjustable contacts, rotatable locking coil means and connections therefrom through the rotatable contact means, exterior isolated controlled circuits, first means for sensing current flow through either relatively stationary contact when engaged by the rotatable relay contact means, means for opening any possible circuit through the other relatively stationary contact responsive to said current flow sensing means, means for initiating and completing a time delay period responsive to said current flow sensing means and for thereafter permitting completion of a circuit through said other relatively stationary contact whenever it is engaged by the rotatable contact means, and second means responsive to current flow through at least one of the relatively stationary contacts for affecting the exterior isolated controlled circuits.

7. The combination of claim 1 further characterized by the loop circuit interconnections extending from said source of control voltage power to said locking coil, a shunt capacitor connected in parallel across said loop circuit interconnections, a charging resistor arranged in series in one of the loop circuit interconnections and interposed between said source of power and said shunt capacitor, and a voltage breakdown device having low resistance with high voltage across itself and high resistance with low current through itself, said voltage breakdown device being interposed in the loop circuit between said shunt capacitor and said locking coil.

References Cited by the Examiner

UNITED STATES PATENTS

| | | | |
|---|---|---|---|
| 2,576,371 | 11/51 | Thompson et al. | 317—152 |
| 2,850,683 | 9/58 | Saint-Amour | 317—152 X |
| 2,947,918 | 8/60 | Hamilton | 317—152 |
| 3,045,150 | 7/62 | Mann | 317—148.5 |

SAMUEL BERNSTEIN, *Primary Examiner.*